US008162363B2

(12) United States Patent
Wang

(10) Patent No.: US 8,162,363 B2
(45) Date of Patent: Apr. 24, 2012

(54) TOOL WITH QUICK POP-UP TOOL HEAD

(76) Inventor: Scott Wang, Renton, WA (US)

( * ) Notice: Subject to any disclaimer, the term of this patent is extended or adjusted under 35 U.S.C. 154(b) by 0 days.

(21) Appl. No.: 13/014,701

(22) Filed: Jan. 26, 2011

(65) Prior Publication Data

US 2011/0122602 A1 May 26, 2011

Related U.S. Application Data

(63) Continuation-in-part of application No. 11/843,834, filed on Aug. 23, 2007, now abandoned.

(51) Int. Cl.
*B25J 1/02* (2006.01)

(52) U.S. Cl. ............ 294/65.5; 294/210; 362/120; 7/901

(58) Field of Classification Search ............. 294/2, 65.5, 294/190, 210, 24; 7/901; 362/119, 120; 81/177.2, 177.4

See application file for complete search history.

(56) References Cited

U.S. PATENT DOCUMENTS

| | | | | | |
|---|---|---|---|---|---|
| 3,924,115 | A | * | 12/1975 | Hampton et al. | 362/577 |
| 5,265,887 | A | * | 11/1993 | Stelmach | 294/65.5 |
| 5,381,319 | A | * | 1/1995 | Shiao | 362/120 |
| 5,836,223 | A | * | 11/1998 | Lin | 81/436 |
| 5,896,606 | A | * | 4/1999 | Huang | 7/165 |
| 5,901,622 | A | * | 5/1999 | Sweeny | 81/439 |
| 6,033,082 | A | * | 3/2000 | Lin | 362/120 |
| 6,048,073 | A | * | 4/2000 | Shiao | 362/120 |
| 6,105,190 | A | * | 8/2000 | Shiao | 7/165 |
| 6,196,695 | B1 | * | 3/2001 | Lai | 362/119 |
| 6,260,980 | B1 | * | 7/2001 | Ping | 362/120 |
| 6,312,138 | B1 | * | 11/2001 | Coleman et al. | 362/120 |
| 6,860,178 | B2 | * | 3/2005 | Wang | 81/177.2 |
| 7,052,155 | B2 | * | 5/2006 | Gavin et al. | 362/120 |
| 7,131,678 | B2 | * | 11/2006 | Ernesti | 294/65.5 |
| 7,174,812 | B1 | * | 2/2007 | Chiang | 81/125 |
| 7,278,751 | B2 | * | 10/2007 | Chang et al. | 362/120 |
| 7,378,928 | B2 | * | 5/2008 | Chang | 335/285 |
| 7,510,295 | B2 | * | 3/2009 | Shih | 362/119 |
| 7,575,334 | B2 | * | 8/2009 | Becnel | 362/118 |
| 2005/0248933 | A1 | * | 11/2005 | Chen et al. | 362/119 |
| 2008/0144309 | A1 | * | 6/2008 | Nagata et al. | 362/120 |

* cited by examiner

*Primary Examiner* — Dean Kramer

(57) ABSTRACT

A tool with quick pop-up tool head includes a body. The body has a handle, a telescopic portion telescopically mounted in the handle, and an operational portion mounted on the telescopic portion such that the operational portion is able to telescopically move relative to the handle. The operational portion has a shoulder disposed on an interior thereof. The telescopic portion has a tool head set mounted therein. The tool head set is selectively engaged with the shoulder and is extendable from the telescopic portion.

3 Claims, 7 Drawing Sheets

TOOL WITH QUICK POP-UP TOOL HEAD

CROSS-REFERENCE TO RELATED APPLICATION

This application is a Continuation-In-Part application of Ser. No. 11/843,834, filed 23 Aug. 2007, and entitled "FLASHLIGHT WITH TELESCOPIC RETRIEVER", now pending.

BACKGROUND OF THE INVENTION

1. Field of the Invention

The present invention relates to a tool, and more particularly to a tool providing a quick pop-up tool head.

2. Description of Related Art

A conventional tool includes a handle. The handle has a telescopic operational rod. The rod has a magnet mounted a distal end thereof. The rod has a seat fixed on the distal end thereof. The seat has a cover mounted on a lateral thereof. The cover has an illuminator mounted thereon. The seat has a power supply mounted in the cover and electrically connected with the illuminator for providing power. A switch is electrically connected with the power supply for controlling the illuminator. A transparent sleeve is sleeved on a lateral of the cover. The magnet is fixed on a distal end of the sleeve.

However, the conventional tool is not provided for searching objects in the dark place. The rod is positioned in a front end of the handle such that the operational space is occupied. When the rod is not operated, the tool is inconvenient to simply use.

The present invention has arisen to mitigate and/or obviate the disadvantages of the conventional tool.

SUMMARY OF THE INVENTION

The main objective of the present invention is to provide an improved tool, and more particular to a tool with quick pop-up tool head.

To achieve the objective, the tool with quick pop-up tool head in accordance with the present invention includes a body. The body has a handle, a telescopic portion telescopically mounted in the handle, and an operational portion mounted on the telescopic portion such that the operational portion is able to telescopically move relative to the handle. The operational portion has a shoulder disposed on an interior thereof. The telescopic portion has a tool head means mounted therein. The tool head means is selectively engaged with the shoulder and is extendable from the telescopic portion. When the operational portion is moved relative to the handle, the tool head means in the telescopic portion is engaged by the shoulder on the operational portion such that the tool head means is quickly and telescopically protruded from the body. The tool head means is a telescopic rod. A length of the telescopic rod is adjustable. The telescopic rod has a magnet mounted on a distal end thereof for adapting to magnetically attract objects. The operational portion includes an illuminator disposed thereon. The illuminator has a through hole defined therein and passing therethrough for receiving the telescopic rod. The shoulder is annularly disposed in an inner periphery of through hole. The illuminator has a plurality of light emitting diodes mounted therein and positioned around the through hole. The telescopic rod is extendable along an illuminant direction of the light emitting diodes. The handle has an outer tube. The telescopic portion has an inner tube received in the outer tube and a spring sleeved on the inner tube. The spring has two ends respectively abutted against the outer tube and the inner tube such that the telescopic portion is able to elastically and telescopically move relative to the handle.

In accordance with another aspect of the present invention, the tool head means is at least one tool bit. The operational portion has at least one through hole defined therein and passing therethrough for correspondingly receiving the at least one tool bit. The shoulder is disposed in an inner periphery of each through hole for engaging with the corresponding tool bit. When the operational portion is moved relative to the handle, each tool bit is engaged by the shoulder to protrude from the body.

Further benefits and advantages of the present invention will become apparent after a careful reading of the detailed description with appropriate reference to the accompanying drawings.

DETAILED DESCRIPTION OF THE INVENTION

Figure 1:
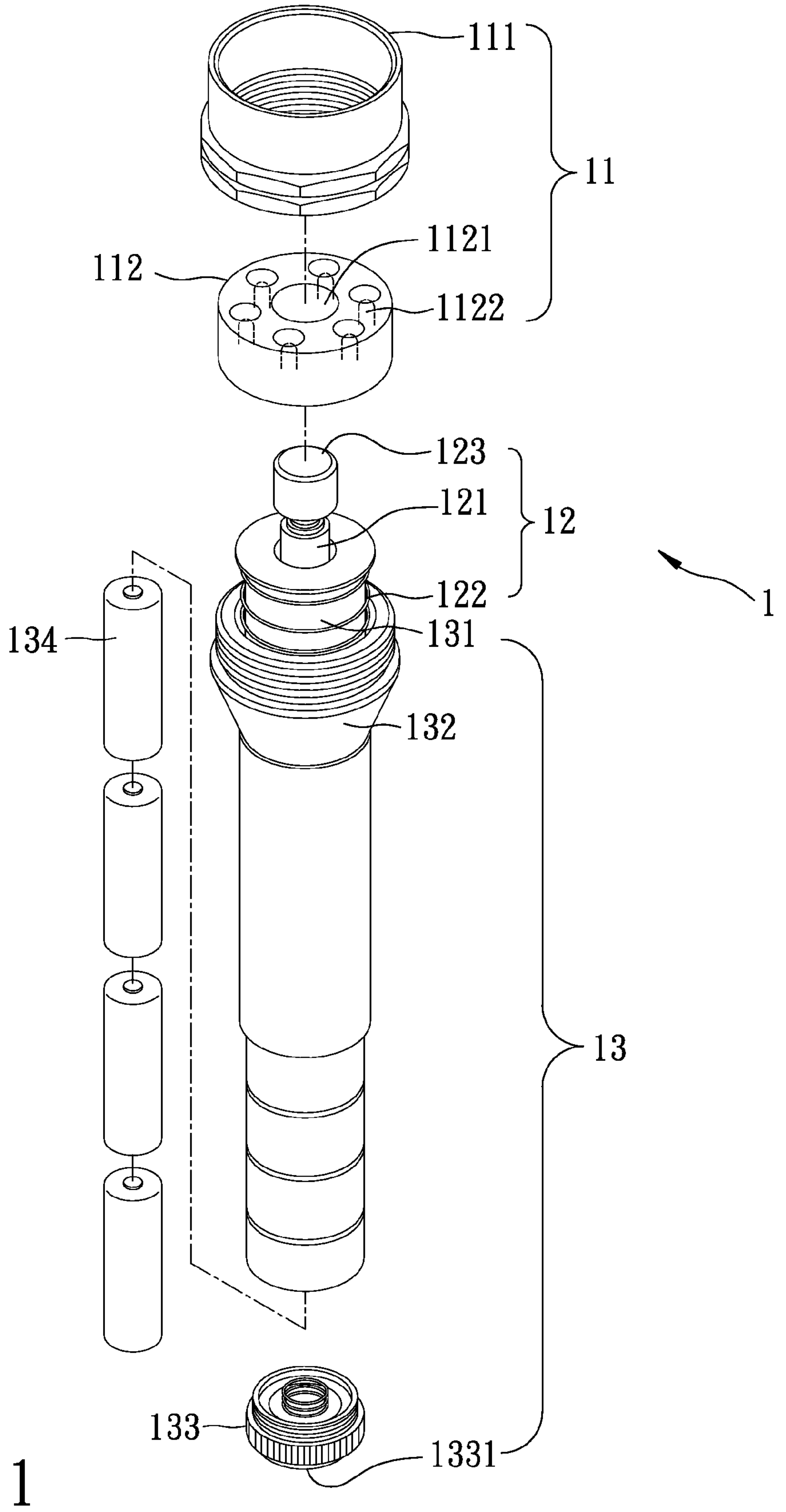
FIG. 1 is an exploded perspective view of a tool with quick pop-up tool head in accordance with the present invention.
Figure 2:
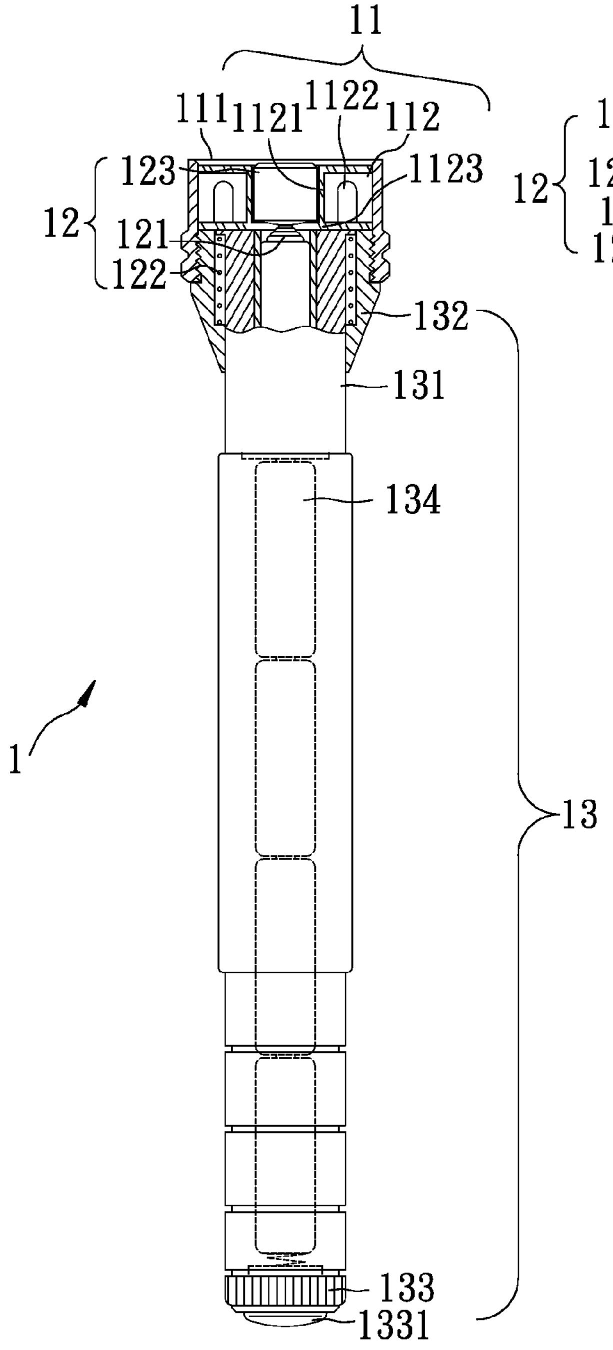
FIGS. 2-4 are cross-sectional operational views of the tool with quick pop-up tool head in accordance with the present invention.

Referring to the drawings and initially to FIGS. 1-7, a tool with quick pop-up tool head in accordance with the present invention comprises a body 1. In the first preferred embodiment of the present invention, the body 1 is a flashlight. The body 1 has a handle 13, a telescopic portion 12 telescopically mounted in the handle 13, and an operational portion 11 mounted on the telescopic portion 12 such that the operational portion 11 is able to telescopically move relative to the handle 13. The handle 13 includes an outer tube 132 and a bottom cap 133 mounted on a bottom of the outer tube 132. The telescopic portion 12 includes an inner tube 131 received in the outer tube 132 and a spring 122 sleeved on the inner tube. The spring 122 is located between the outer tube 132 and the inner tube 131. The spring 122 has two ends respectively abutted against the outer tube 132 and the inner tube 131 such that the telescopic portion 12 is able to elastically and telescopically move relative to the handle 13. The telescopic portion 12 has a tool head means mounted therein. In the first preferred embodiment of the present invention, the tool head means is a telescopic rod 121. A length of the telescopic rod 121 is adjustable. The telescopic rod 121 has a magnet 123 mounted on a distal end thereof for adapting to magnetically attract metallic objects. An adjustable portion 1211 is disposed between the magnet 123 and the telescopic rod 121. The adjustable portion 1211 is freely bendable. The operational portion 11 includes an illuminator 112 mounted on the inner tube 131 of the telescopic portion 12 and an outer cover 111 sleeved on the illuminator 112. The illuminator 112 has a through hole 1121 defined therein and passing therethrough for receiving the telescopic rod 121. A shoulder 1123 is disposed in an inner periphery of the through hole 1121 for selectively engaging with the magnet 123 of the telescopic rod 121. The illuminator 112 has a plurality of light emitting diodes 1122 mounted therein and positioned around the through hole 1121. A plurality of batteries 134 are mounted in the outer tube 132 and electrically connected with the illuminator 112 for providing power. The bottom cap 133 has a switch 1331 mounted thereon and electrically connected with batteries 134 for controlling an illumination of the illuminator 112.

Figure 3:
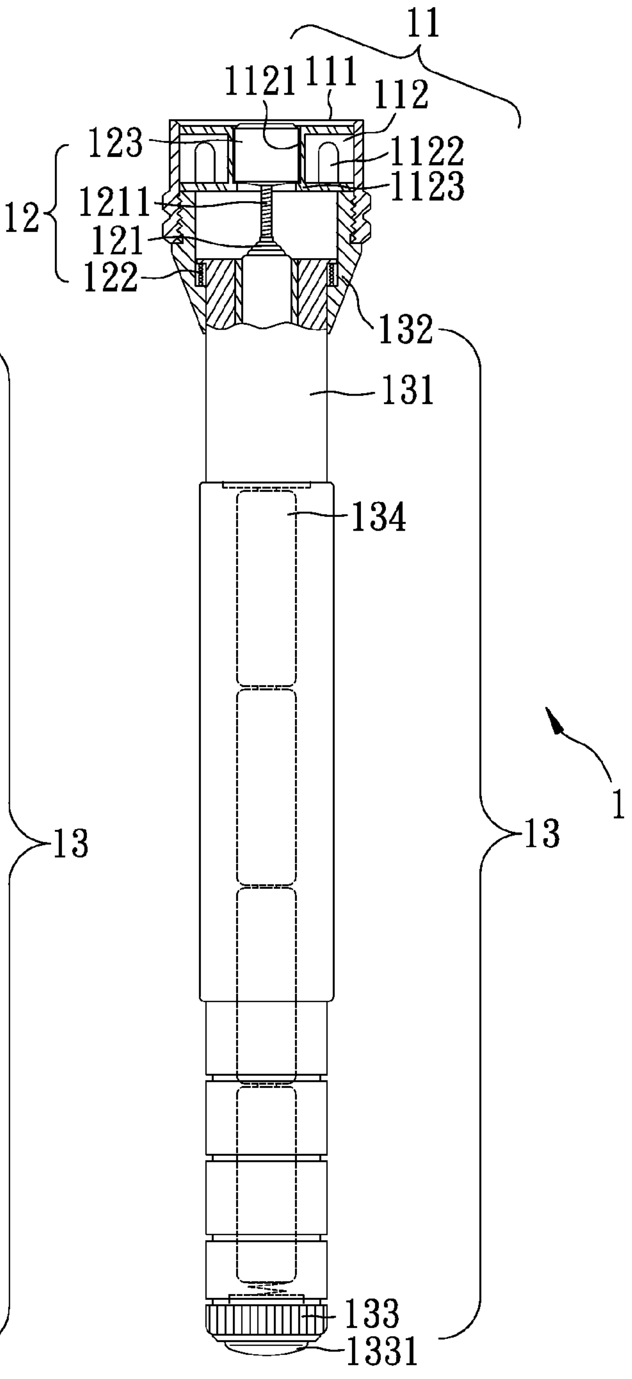
Figure 4:
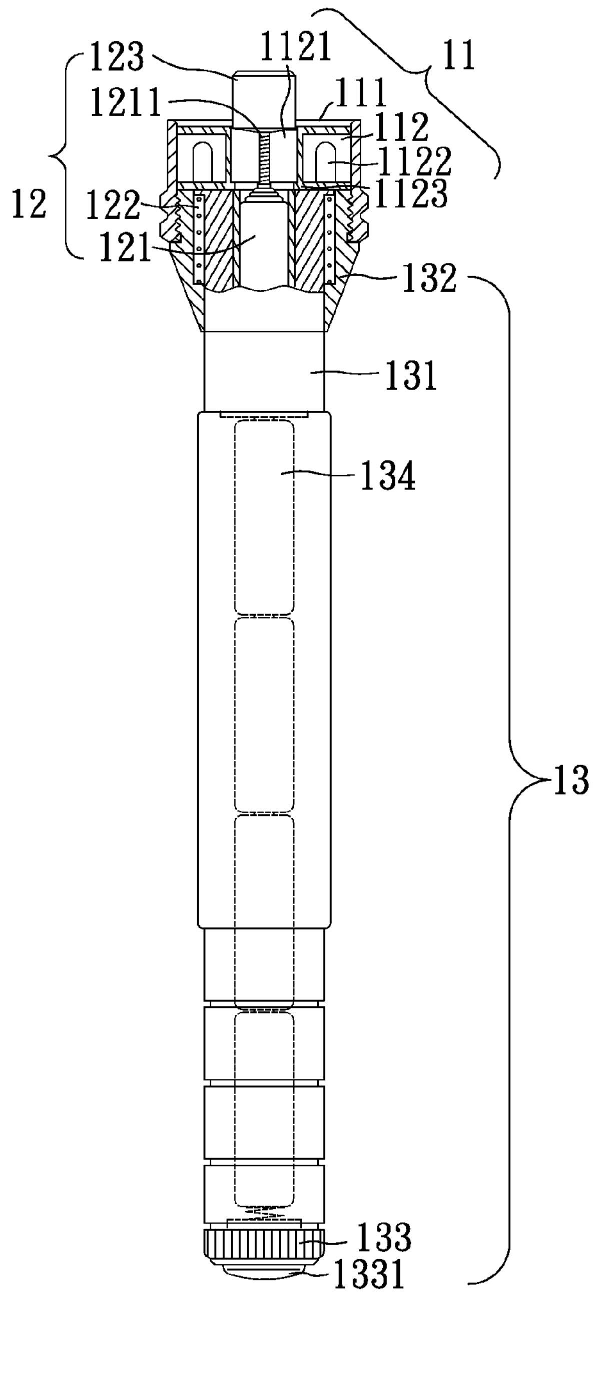

With reference to FIGS. 2-5, that shows operations of the present invention. In the initial stage, the magnet 123 is completely received in the through hole 1121. The body 1 is looked like a normal flashlight and is operated as the normal flashlight. As shown in FIG. 3, when outer cover 111 of the operational portion 11 is outwardly pulled relative to the handle 13, in the meanwhile, the inner tube 131 of the telescopic portion 12 is pulled with the outer cover 111, the shoulder 1123 of through hole 1121 in the illuminator 112 is outwardly engaged with the magnet 123 of the telescopic rod 121 such that the telescopic rod 121 is extended. As shown in FIG. 4, when the outer cover 111 is released, the inner tube 131 is pulled by the spring 122 to move toward the outer tube 132, such that the inner tube 131 with the operational portion 11 are restored to the initial stage. The magnet 123 is kept in the same place and protruded from the body 1.

Figure 5:
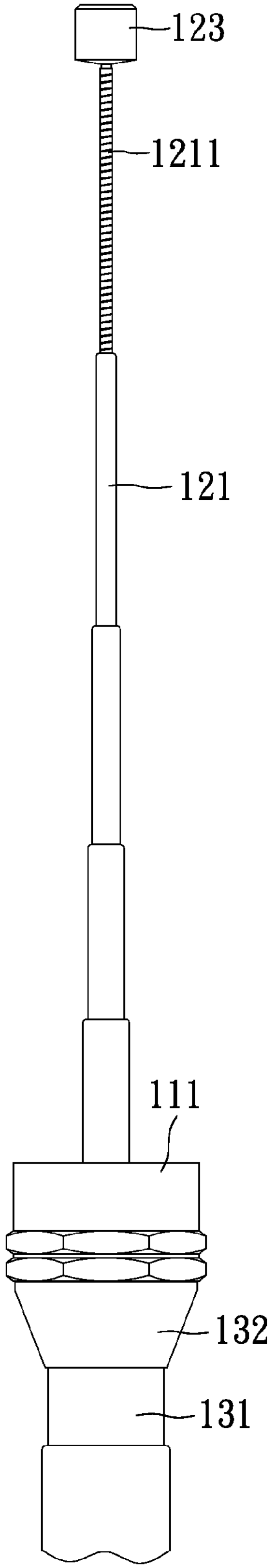
FIGS. 5-7 are operational perspective views of a telescopic rod of the tool with quick pop-up tool head in accordance with the present invention.
Figure 6:
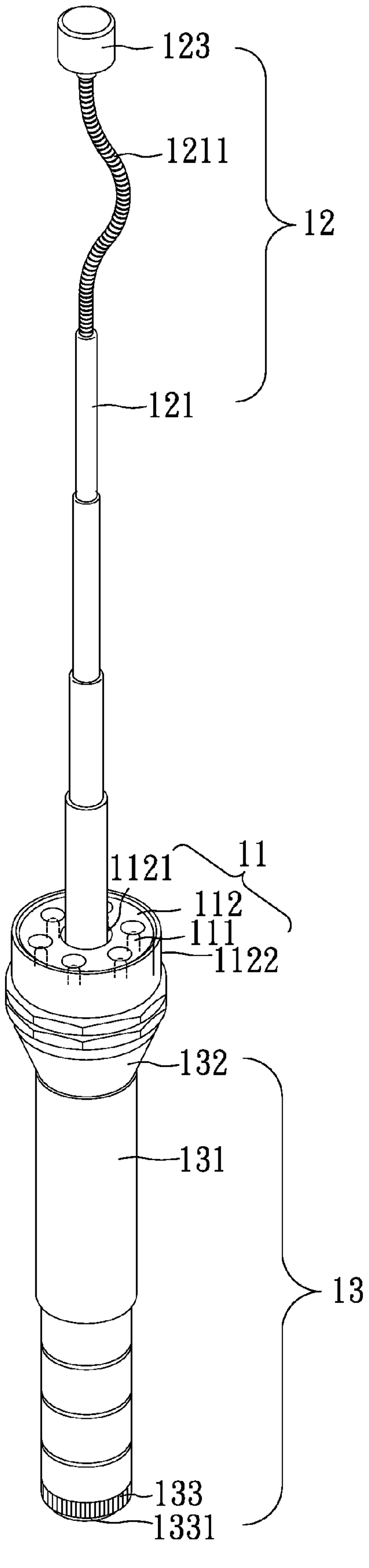
Figure 7:
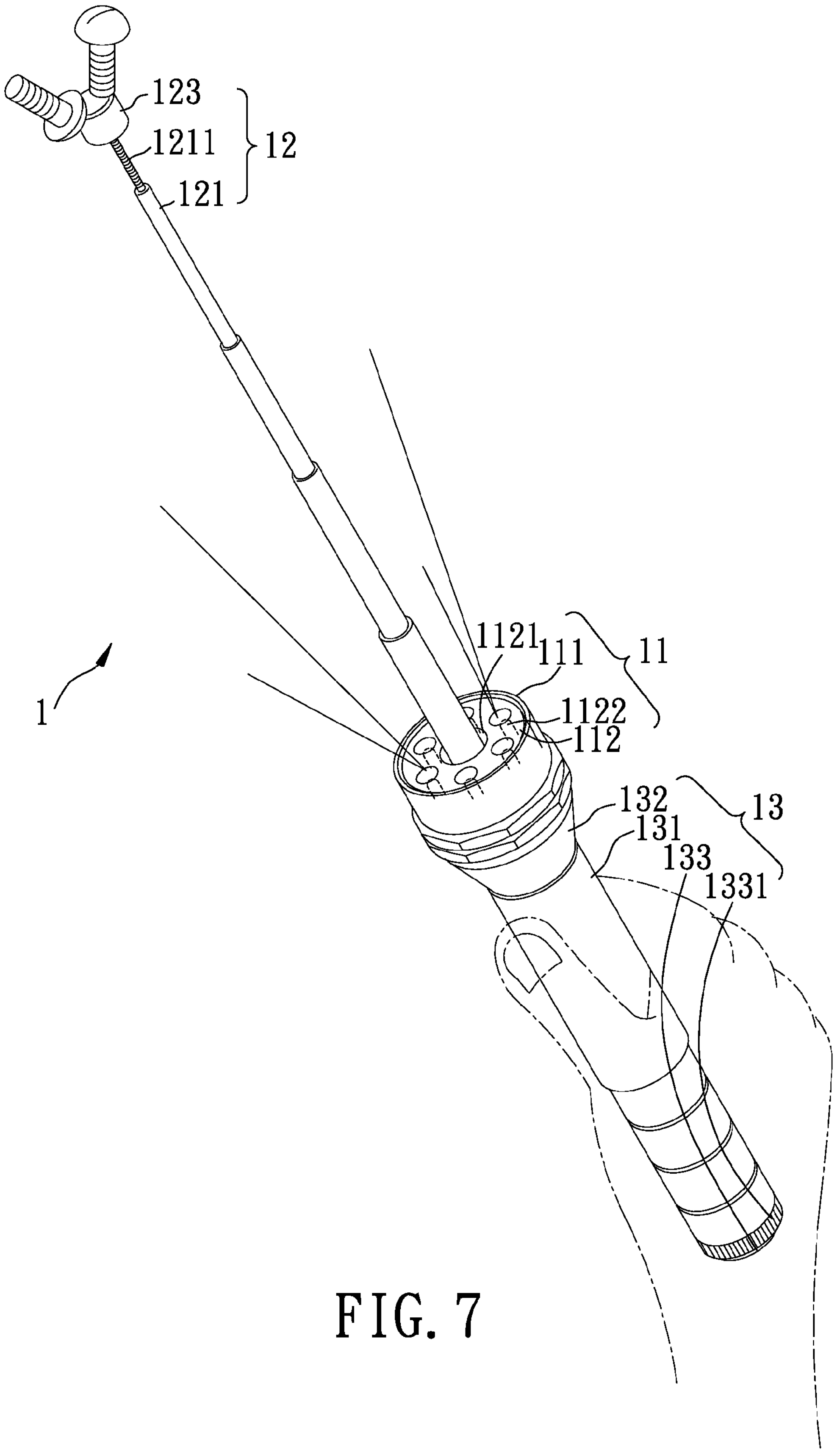

As shown in FIGS. 5-7, the magnet 123 is continuously pulled out and the telescopic rod 121 is extended. A shape of the body 1 is not looked liked a usual flashlight. The telescopic rod 121 is extended along an illuminant direction of the light emitting diodes 1122 such that a user can use the magnet 123 to easily pick up objects in the dark place. The adjustable portion 1211 is freely bendable such that the magnet 123 can deeply penetrate into a slit or an untouchable place. Furthermore, when the telescopic rod 121 is not used, the magnet 123 with the telescopic rod 121 is completely stored in the handle 13, therefore, the body 1 is used as the usual flashlight. The magnet 123 with the telescopic rod 121 will not obstruct the operation of the flashlight. The magnet 123 can be easily and quickly pop-up from the body 13. The user just simply pulls and releases the operation portion 11, the magnet 123 is protruded from the body 1. It is very convenient.

Figure 8:
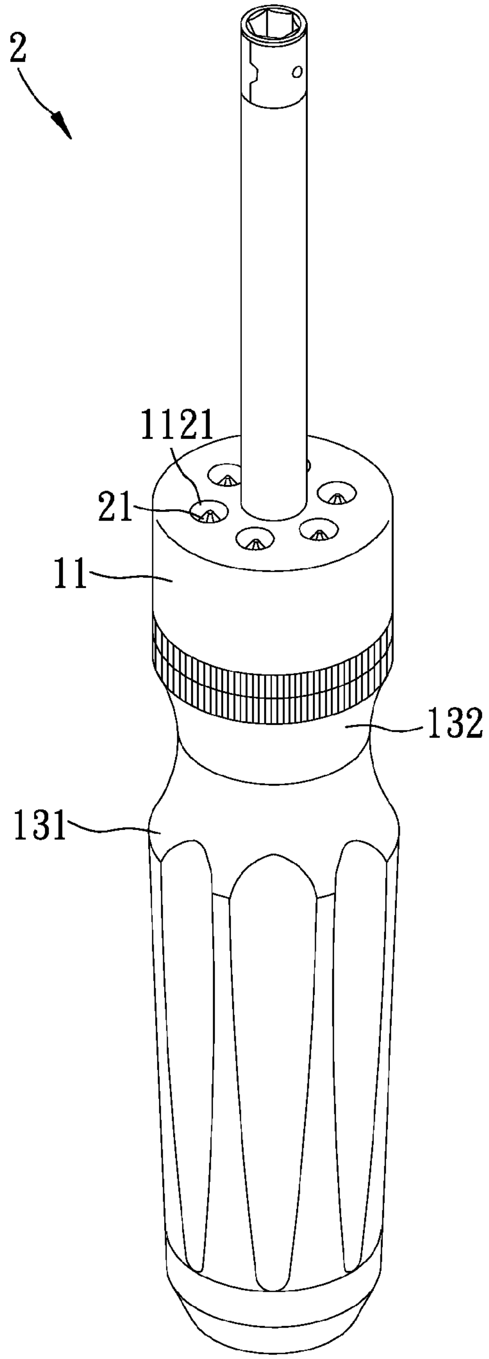
FIGS. 8-10 are operational perspective views of a second embodiment of the tool with quick pop-up tool head in accordance with the present invention.
Figure 9:
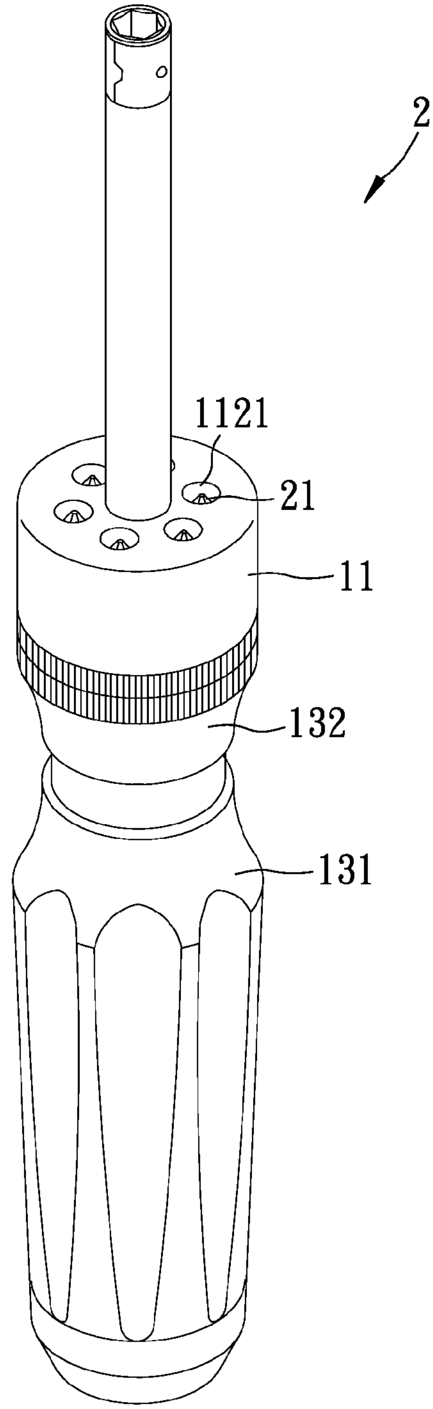
Figure 10:
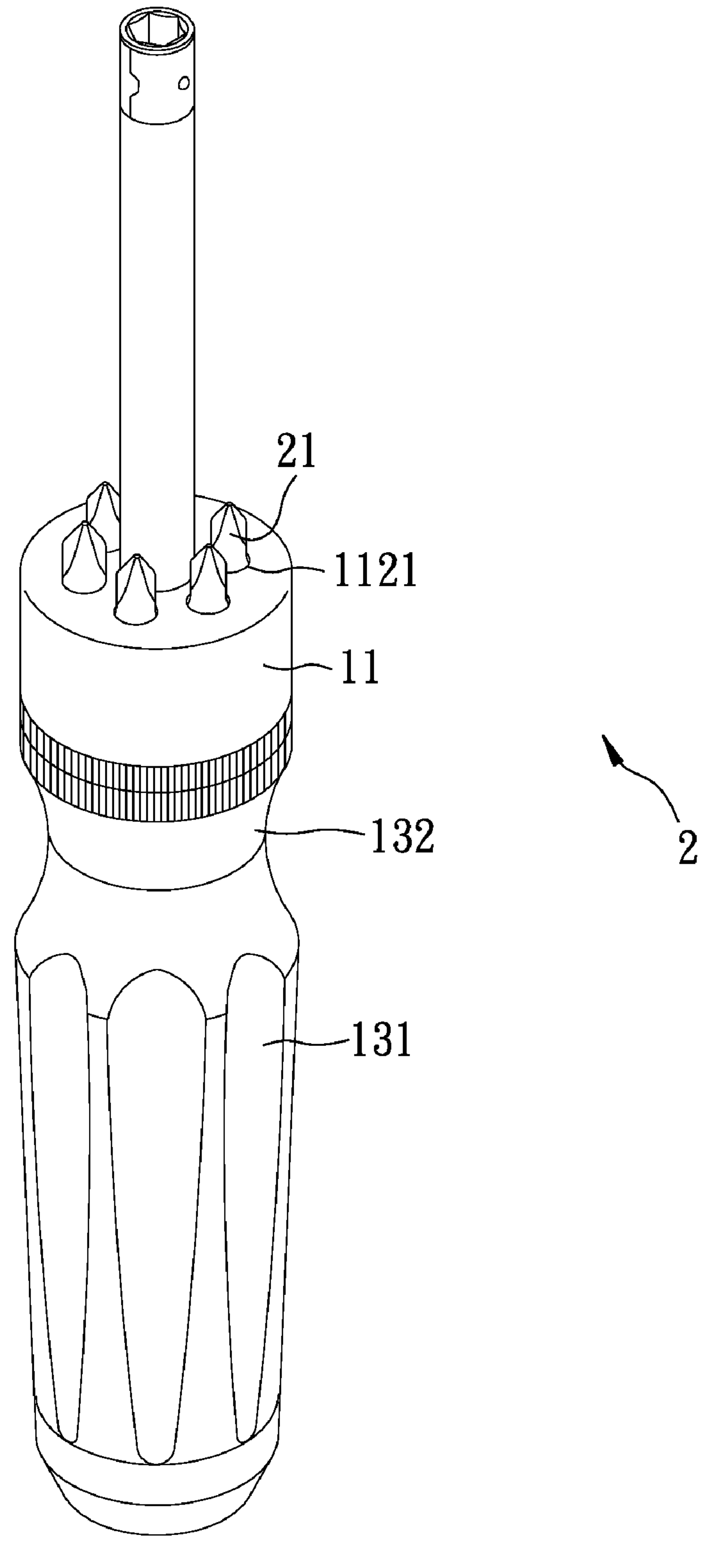

With reference to FIGS. 8-10, that shows a second preferred embodiment of the tool with quick pop-up tool head in accordance with the present invention. The elements and effects of the second embodiment which are the same with the first embodiment are not described, only the differences are described. The body 2 is a screw driver having a driving rod (not numbered) for providing to assemble with a tool bit. The tool head means are a plurality of tool bits 21. The tool bits 21 have various shapes provided for different operational requirements. The operational portion 11 has a plurality of through holes 1121 defined therein and passing therethrough for correspondingly receiving the tool bits 21. Each through hole 1121 has the shoulder (not shown) in the inner periphery thereof for engaging with the corresponding tool bit 21. When operating, the user just pulls and releases the operational portion 11, the inner tube 132 is moved relative to the outer tube 131, such that the tool bits 21 are engaged by the shoulders in the through holes 1121 and protruded from the body 2. Therefore, the user can easily choose a favorite tool bit 21 and assemble the tool bit 21 on the driving rod.

Although the invention has been explained in relation to its preferred embodiment, it is to be understood that many other possible modifications and variations can be made without departing from the spirit and scope of the invention as hereinafter claimed.

What is claimed is:

1. A tool with quick pop-up tool head, comprising:

a body, the body having a handle, a telescopic portion telescopically mounted in the handle, and an operational portion mounted on the telescopic portion such that the operational portion is able to telescopically move relative to the handle, the operational portion having a shoulder disposed on an interior thereof, the telescopic portion having a tool head means mounted therein, the tool head means selectively engaged with the shoulder and being extendable from the telescopic portion;

wherein the tool head means is a telescopic rod, a length of the telescopic rod being adjustable; the operational portion includes an illuminator disposed thereon, the illuminator having a through hole defined therein and passing therethrough for receiving the telescopic rod, the shoulder annularly disposed in an inner periphery of through hole, the illuminator having a plurality of light emitting diodes mounted therein and positioned around the through hole; the telescopic rod is extendable along an illuminant direction of the light emitting diodes;

thereby when the operational portion is moved relative to the handle, the tool head means in the telescopic portion is engaged by the shoulder on the operational portion such that the tool head means is quickly and telescopically protruded from the body.

2. The tool with quick pop-up tool head as claimed in claim 1, wherein the telescopic rod has a magnet mounted on a distal end thereof for adapting to magnetically attract objects.

3. The tool with quick pop-up tool head as claimed in claim 1, wherein the handle has an outer tube, the telescopic portion having an inner tube received in the outer tube and a spring sleeved on the inner tube, the spring having two ends respectively abutted against the outer tube and the inner tube such that the telescopic portion is able to elastically and telescopically move relative to the handle.

* * * * *